US009100139B2

(12) United States Patent
Schmidt et al.

(10) Patent No.: US 9,100,139 B2
(45) Date of Patent: Aug. 4, 2015

(54) OPTICAL COMMUNICATION LINK EMPLOYING COHERENT DETECTION AND OUT OF BAND CHANNEL IDENTIFICATION

(75) Inventors: Theodore J. Schmidt, Gilroy, CA (US); Roberto Marcoccia, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 494 days.

(21) Appl. No.: 13/460,456

(22) Filed: Apr. 30, 2012

(65) Prior Publication Data

US 2013/0286847 A1 Oct. 31, 2013

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04J 1/00* | (2006.01) |
| *H04B 10/06* | (2006.01) |
| *H04B 10/04* | (2006.01) |
| *H04B 10/12* | (2006.01) |
| *H04J 14/00* | (2006.01) |
| *H04J 14/02* | (2006.01) |

(52) U.S. Cl.
CPC ......... *H04J 14/0258* (2013.01); *H04J 14/0276* (2013.01)

(58) Field of Classification Search
CPC ..... H04B 10/6164; H04B 10/63; H04B 10/64
USPC ................................................ 398/202–214
See application file for complete search history.

(56) References Cited

U.S. PATENT DOCUMENTS

| | | | |
|---|---|---|---|
| 5,272,556 A * | 12/1993 | Faulkner et al. ................. 398/71 |
| 8,670,680 B2 * | 3/2014 | Tanaka et al. .................. 398/208 |
| 8,774,646 B2 * | 7/2014 | McNicol ........................ 398/209 |
| 2003/0025957 A1 * | 2/2003 | Jayakumar ..................... 359/110 |
| 2011/0033182 A1 * | 2/2011 | Haunstein et al. .............. 398/26 |
| 2012/0051739 A1 * | 3/2012 | Stephens et al. ................ 398/25 |
| 2012/0328297 A1 * | 12/2012 | Hoshida .......................... 398/85 |

OTHER PUBLICATIONS

Zhang, et al., "Towards full band colorless reception with coherent balanced receivers," Optics Express, vol. 20, No. 9, Apr. 23, 2012, pp. 10339-10352.
Anslow, et al., "Frequency Selective Coherent Receiver for Agile Networks," Optical Communications, Sep. 24-28, 2006, 2 pages.
Bianciotto, et al., "Coherent Wavelength Selection for Cost Effective, Next Generation Optical Transport Networks," Photonische Netze-03; ISBN 978-3-8007-3249-4, VDE Verlag GMBH, Berlin, Apr. 5, 2010, 5 pages.

(Continued)

*Primary Examiner* — Ken Vanderpuye
*Assistant Examiner* — Mina Shalaby
(74) *Attorney, Agent, or Firm* — Harrity & Harrity, LLP (57) ABSTRACT

An optical system may include: a demultiplexer to receive an optical signal and to demultiplex the optical signal into a plurality of optical channels; a detector circuit to: receive the plurality of optical channels, and identify a predetermined channel identification trace tone frequency for an optical channel of the plurality of optical channels; and a receiver to: receive the optical channel with the identified predetermined channel identification trace tone frequency from the detector circuit, and process the optical channel.

21 Claims, 6 Drawing Sheets

(56) References Cited

OTHER PUBLICATIONS

Sakamaki, et al., "Experimental demonstration of multi-degree colorless, directionless, contentionless ROADM for 127-Gbits/s PDM-QPSK transmission system," Optics Express, vol. 19, No. 26, Dec. 12, 2011, pp. B1-B11.

Nelson, et al., "Detection of a Single 40 Gb/s Polarization-Multiplexed QPSK Channel With a Real-Time Intradyne Receiver in the Presence of Multiple Coincident WDM Channels," Journal of Lighwave Technology, vol. 29, No. 20, Oct. 15, 2010, pp. 2933-2943.

Xie, et al., "Colorless Coherent Receiver Using 3×3 Coupler Hybrids and Single-Ended Detection," ECOC Postdeadline Papers, 2011, 3 pages.

\* cited by examiner

Fig. 1A  Trace tone frequency (fn)

Fig. 1B  Optical carrier frequency (Fn)

Fig. 1C  Optical carrier frequency (Fn) with trace tone frequency (fn) superimposed Fig. 1D  Optical carrier frequency with trace tone frequency and data superimposed

OPTICAL COMMUNICATION LINK EMPLOYING COHERENT DETECTION AND OUT OF BAND CHANNEL IDENTIFICATION

BACKGROUND

Optical systems, such as fiber optic communication systems, may include optical transmitters to transmit optical signals and optical receivers to receive the optical signals from the optical transmitters using multiple optical channels (e.g., with different carriers) on single fibers. Optical receivers may detect incoming optical signals on these single fibers by using direct detection of the optical signals. A disadvantage of direct detection is the inability to distinguish an optical channel's frequency due to the optically broadband nature of common photo-detectors. As such, if more than one optical channel is incident on a direct detection receiver, more than one optical channel may be converted to baseband by the photo-detector (e.g., demodulated electrical output) and each converted optical channel may interfere with each other and degrade the quality of the information carried in the optical channels. This interference may be referred to as crosstalk.

In the case of direct detection, if more than one optical channel is incident on a receive port, a fixed optical frequency discriminator (e.g. optical filter) may be used in the receiver to reduce the crosstalk issue described above. Alternatively, a tunable optical filter may be employed in place of the fixed optical filter. The tunable filter may be able to provide a flexible optical frequency selection at the receive port, but may be expensive and complex compared to alternative optical frequency selective architectures that select the optical frequency prior to the receive port (e.g., optical add/drop multiplexer (OADM) or reconfigurable OADM (ROADM) architectures).

ROADMs provide a means for building optical networks that automate add/drop optical frequency assignments. The optical frequency to optical port assignment on the add/drop can be fixed or reconfigurable. For the later, colorless ROADM functionality, in which multiple channels at multiple optical frequencies may be broadcast to multiple receivers, may be used to allow flexible reconfiguration of optical connections as network requirements change. The broadcasting of multiple channels to an optical port may force a receiver to be able to discriminate an incident channel (or channels) of interest from other incident channels, which may lead to complications, such as those described above in the case of direct detection receivers.

One way to provide colorless ROADM functionality is to use coherent detection with a local oscillator (LO) that may serve as an optical frequency discriminator (e.g., substituted for an optical filter). For example, optical coherent heterodyne or homodyne detection can be used. In heterodyne detection, an optical signal (or channel) of interest (at some frequency) is non-linearly mixed in a photodiode with a reference LO optical frequency. The reference LO optical frequency may be set at an optical frequency close to the optical signal. A resulting current from the photodiode may carry the original optical signal information (e.g., amplitude, phase, and frequency modulation) of the original signal at the optical frequency, but may be centered at a difference frequency (e.g., a difference between signal optical frequency and LO optical frequency). This resulting current electrical representation of the optical signal can be electrically filtered.

If the LO optical frequency is offset relative to the optical signal by less than a particular amount (e.g., a symbol rate or analog bandwidth of the optical signal) of the optical signal, typically referred to as "intradyne" detection, simple low pass electrical filtering may be sufficient to reject unwanted channels. The electrical filtering can be accomplished via: an addition of at least one dedicated electrical filter (e.g., low-pass or bandpass) after the photodiode; the inherent bandwidth of the electrical functions filtering the unwanted channels; or a combination thereof. In the case of multiple optical signals (or channels) present at the photodiode, the electrical filtering can be used to reject unwanted channels from subsequent signal processing to provide frequency discrimination. However, while a coherent receiver may utilize the LO as a frequency discriminator, the coherent receiver may not be able to determine the quantity and/or type of channels that may be incident on the coherent receiver.

The quantity and/or type of channels incident on a receiver may be provided to the receiver (or a control module of the receiver) by a network control plane (e.g., hardware or a combination of hardware and software that may control an optical system and may have set the quantity of channels initially). However, if a channel is provided from a source not controlled by the network control plane (e.g., an alien optical frequency channel from an outside or third party source), then the network control plane may not have information about this channel. Without information about the channel, the network control plane may not be able to provide the receiver with the number of channels that may be incident on the receiver. In this case, these channels (e.g. alien optical frequency channels), including the number of channels incident to a receiver, may be unknown to the network control plane and therefore unknown to the receiver.

If the quantity of channels incident is unknown by a network control plane, the quantity of channels incident on a receiver may be detected by the LO. The LO may sweep across possible optical channel frequencies looking for the presence of signal channels at each optical channel frequency (e.g. by monitoring the photocurrent from at least one photodiode in the receiver) to find the quantity of channels incident on the receiver. Using the LO in this manner, however, may be service impairing or disrupting due to the nature of the LO sweep, as described above.

SUMMARY

In one possible implementation, an example optical system is provided. The example optical system may include a demultiplexer to receive an optical signal and to demultiplex the optical signal into multiple optical channels. Additionally, or alternatively, the example optical system may include a detector circuit to receive the multiple optical channels, and identify a predetermined channel identification trace tone frequency for an optical channel of the multiple optical channels. Additionally, or alternatively, the example optical system may include a receiver to receive the optical channel with the identified predetermined channel identification trace tone frequency from the detector circuit, and process the optical channel to output a data stream.

In another possible implementation, an example method can include: setting, by one or more devices, a predetermined channel identification trace tone frequency, superimposing the predetermined channel identification trace tone frequency on an optical signal, receiving, by the one or more devices, the optical signal with the superimposed predetermined channel identification trace tone frequency, and scanning, by the one or more devices, for trace tone frequencies in the optical signal.

Additionally, or alternatively, the example method can also include identifying, by the one or more devices, the predetermined channel identification trace tone frequency for the receiver channel in the optical signal, providing, by the one or more devices, the predetermined channel identification trace tone frequency to a control module of the one or more devices, and setting a local oscillator, by the control module, to a predetermined optical frequency. Additionally, or alternatively, the example method can also include mixing the LO optical frequency with the optical signal in at least one photodiode, to output an electrical representation of a select optical channel based on the predetermined channel identification trace tone frequency, and processing the select channel, by the one or more devices, to output a data stream.

In another possible implementation, an example receiver device can include a detector circuit to: receive an optical signal with multiple different optical channels of different frequencies including an optical channel with an amplitude modulated trace tone frequency, scan the optical signal for the optical channel with the amplitude modulated trace tone frequency, and identify the optical channel with the amplitude modulated trace tone frequency. Additionally, or alternatively, the example receiver device may include a receiver to: receive the optical signal with the plurality of different optical channels including the optical channel with the amplitude modulated trace tone frequency and receive information identifying the amplitude modulated trace tone frequency from the detector circuit. Additionally, or alternatively, the example receiver device may include a receiver to: filter the optical signal to receive the optical channel with the amplitude modulated trace tone frequency and process the optical channel with the amplitude modulated trace tone to output a data stream.

In one possible implementation, an example transmitter device can include multiple optical sources to generate multiple optical channels with a first frequency type and data superimposed on the first frequency type, and multiple identification generators to provide trace tones with a second frequency type. Additionally, or alternatively, the multiple identification generators may superimpose the trace tones on the plurality of optical channels or the plurality of optical sources to superimpose the plurality of optical channels on the trace tones. Additionally, or alternatively, the example transmitter device may include a multiplexer to combine the multiple optical channels from the multiple identification generators into an optical signal.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Systems and/or methods, described herein, may provide superimposed channel identification tones (e.g., trace tones) on optical transmission channels to provide channel identification for colorless functionality systems and/or methods. The trace tones may include amplitude modulations of optical signals in optical transmission channels. The trace tones may be uniquely chosen such that a particular trace tone frequency may be distinguished from other trace tone frequencies to identify one optical channel from other optical channels.

The trace tone may be a low frequency modulated tone that may utilize a signal-to-noise ratio (SNR) at a receiver to distinguish one trace tone from another trace tone. The trace tone can be combined with an optical channel such that a particular optical channel can be distinguished from other optical channels. Additionally, or alternatively, optical channel frequencies can be correlated with optical local oscillator (LO) frequencies such that once a particular optical channel is identified, a particular optical local oscillator frequency can be used with the particular optical channel to allow for detection by a receiver.

FIGS. 1A-1D are illustrations of example frequencies that may be used for encoding a trace tone via amplitude modulation of an optical channel. The example frequencies are shown to generally illustrate the concept of superimposing a trace tone frequency and data signal on an optical carrier frequency, and are not shown to scale.

Figure 1A:
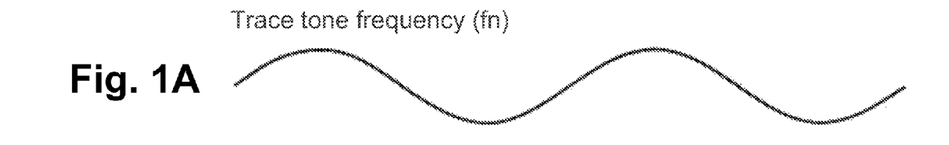
FIGS. 1A-1D are illustrations of example optical frequencies that may be used for encoding a channel identification tone via amplitude modulation of an optical channel, as described herein.

FIG. 1A illustrates a trace tone frequency (fn). The trace tone frequency may be between 1 Hz and 1 GHz. In one implementation, the trace tone frequency may be between 10 kHz and 1 MHz.

Figure 1B:
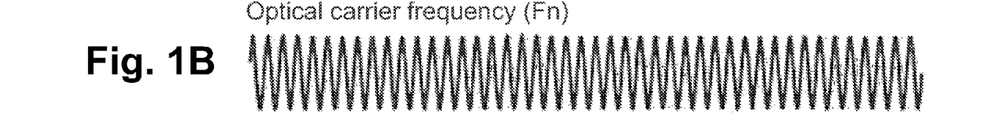

As illustrated in FIG. 1B, an optical channel frequency (Fn) is illustrated. In one implementation, the optical channel frequency (Fn) may have a frequency in the 180-210 terahertz (THz) range. For example, a 192 THz optical channel frequency (Fn) may be provided. An amplitude modulation depth may be chosen independently of the trace tone frequency (fn) and the optical channel frequency (Fn). The amplitude modulation depth can be chosen to balance the impact on data with the SNR of the trace tone at a receiver. For example, if a small amplitude modulation depth is chosen, the amplitude modulation may have little to no effect on the data, but may result in a low SNR of the trace tone at the receiver. On the other hand, if a large amplitude modulation depth is chosen, the amplitude modulation may have a large impact on the data, but may also result in a high SNR of the trace tone at the receiver. In one implementation, the amplitude modulation depth may be in the range of approximately 1% to 20%.

Figure 1C:
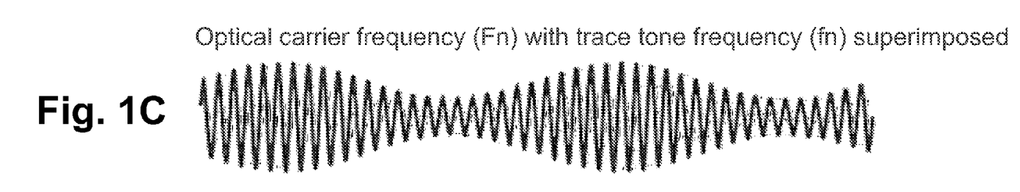

FIG. 1C illustrates the trace tone frequency (fn) of FIG. 1A encoded as an amplitude modulation of the optical channel of FIG. 1B. As illustrated in FIG. 1C, the trace tone frequency (fn) may be superimposed on the optical channel frequency (Fn) of FIG. 1B, which results in an amplitude modified channel that includes the optical channel frequency (Fn) with the trace tone frequency (fn) superimposed on the optical channel frequency (Fn).

Figure 1D:
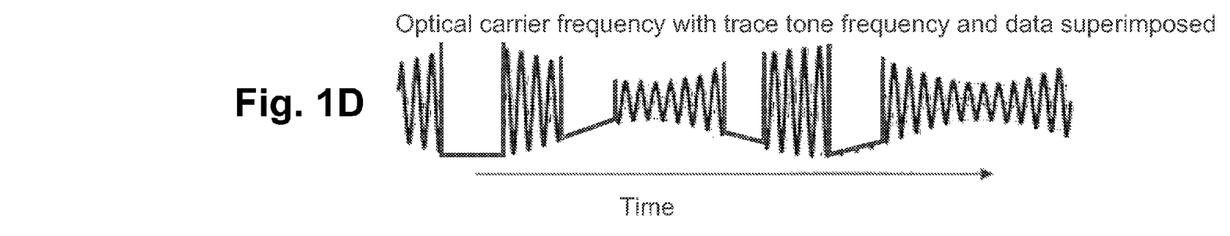

FIG. 1D illustrates the trace tone frequency (fn) and the optical channel frequency (Fn) with data superimposed thereon. An on-off-keyed amplitude modulation data format is illustrated for simplicity, but the data also be encoded in phase, frequency, polarization, or a combination thereof (not shown). In one implementation, the data may be provided in the 100 Gb/sec range. As illustrated in FIG. 1D, the trace tone frequency (fn), the optical channel frequency (Fn), and the encoded data may each be distinguished and the trace tone frequency (fn) may allow the optical channel frequency (Fn) and the encoded data to operate without disruption by the trace tone frequency (fn). For example, if the trace tone frequency (fn) is too high, then the optical channel frequency (Fn) and/or the encoded data may not be readable from the combination of frequencies or may disrupted by the high trace tone frequency (fn).

As illustrated, the trace tone frequency (fn) may be provided at a lower frequency than the optical channel frequency (Fn). For example, the trace tone frequency (fn) may be provided at a particular frequency (e.g., significantly lower frequency compared to the optical channel frequency (Fn) and data rate), such that the data encoded in the optical channel can be readily detected.

Figure 2:
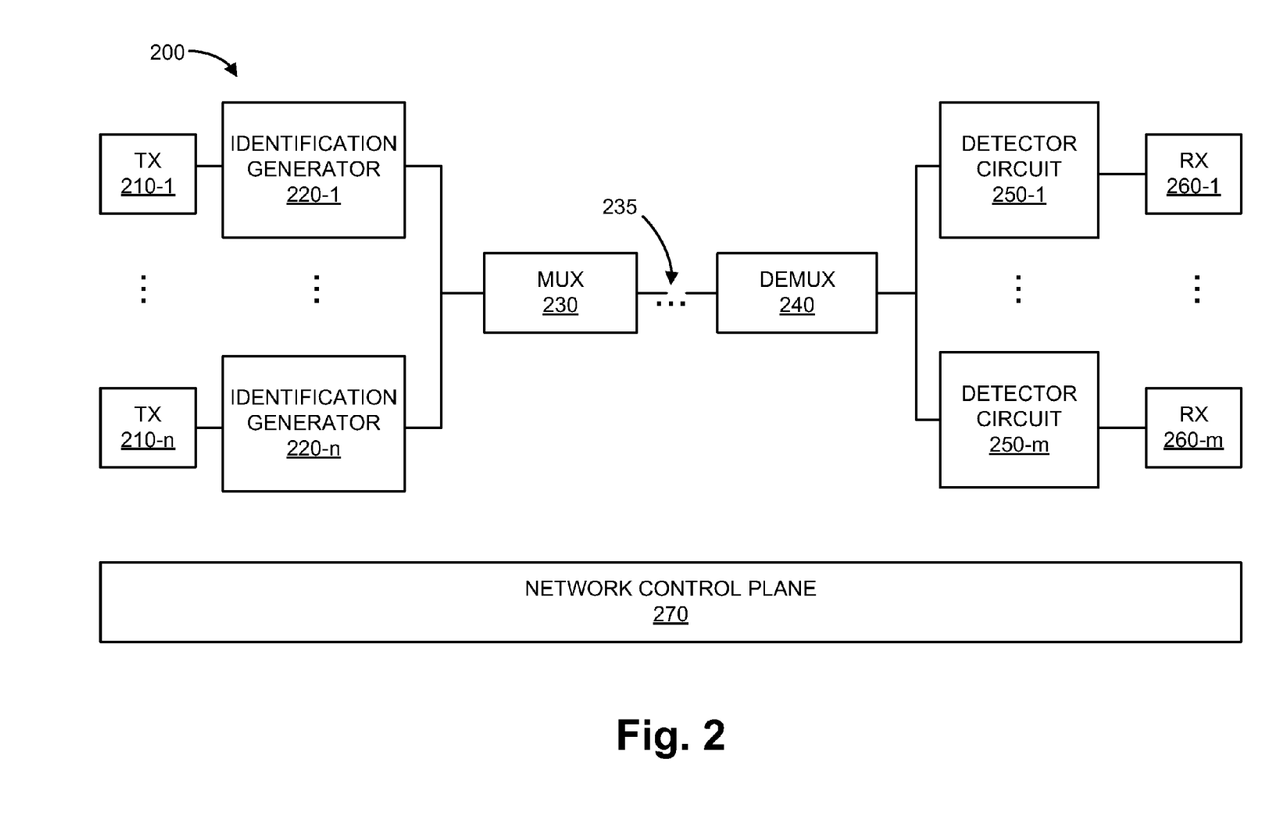
FIG. 2 illustrates an overview of example system that provides one or more channel identification tones to one or more optical signals, as described herein.

FIG. 2 illustrates an overview of example system 200 that provides one or more trace tone frequencies (fn) to one or more optical signals. As illustrated in FIG. 2, example system 200 may include multiple transmitters 210-1 through 210-n (n>1)(referred to collectively in some instances as "transmitters 210" and individually as "transmitter 210"), multiple identification generators 220-1 through 220-n (n>1) (referred to collectively in some instances as "identification generators 220" and individually as "identification generator 220"), a multiplexer 230, an optical communication path 235, a demultiplexer 240, multiple detector circuits 250-1 through 220-m (m>1) (referred to collectively in some instances as "detector circuits 250" and individually as "detector circuit 250"), multiple receivers 260-1 through 220-m (m>1) (referred to collectively in some instances as "multiple receivers 260" and individually as "multiple receiver 260"), and a network control plane 270. Although FIG. 2 shows example components of system 200, in other implementations, system 200 may include fewer components, different components, differently arranged components, or additional components than depicted in FIG. 2.

Alternatively, or additionally, one or more components of system 200 may perform one or more tasks described as being performed by one or more other components of system 200. Alternatively, or additionally, components on the transmission side of system 200 (e.g., transmitters 210, identification generators 220, and multiplexer 230) and/or components on the receiving side of system 200 (e.g., demultiplexer 240, detector circuits 250, and receivers 260) may be implemented within a device or may be implemented in separate devices.

Transmitters 210 may include optical sources, such as lasers. Transmitters 210 may be associated with one of multiple data or information streams. Transmitters 210 will be further discussed with respect to FIG. 3.

Identification generators 220 may include circuits that may be part of transmitters 210 or separate from transmitters 210, such as separate modules, cards, or boards. Identification generators 220 may include digital signal processors (DSPs) to generate digital representations of particular channel identifications. In one implementation, identification generators 220 may include DSPs to superimpose trace tones (e.g., particular channel identification tones) on optical signals. Digital representations of the particular channel identifications may be converted to an analog representation via a Digital-to-Analog Converter (DAC). The digital representation of the particular channel identification in analog form may be provided to multiplexer 230 via an amplifier to superimpose the analog channel identification on the transmitted signal. In one implementation, the amplifier may include a linear amplifier.

If identification generators 220 are implemented external to transmitter 210, then identification generators 220 that may be provided between transmitters 210 and combiner 230. Identification generators 220 may include a transmitter-side element that receives a trace tone assignment from transmitters 210 or from network control plane 270 that sets both an optical frequency and a corresponding trace tone for transmitters 210. Network control plane 270 and control modules are discussed below with respect to FIG. 6.

Identification generators 220 may provide a trace tone for each channel provided by transmitters 210. Identification generators 220 will be discussed further with respect to FIGS. 3 and 5.

Multiplexer 230 may include an optical combiner, a multiplexer, an Arrayed Waveguide Grating (AWG), and/or one or more optical filters. Multiplexer 230 may combine optical signals with trace tones from transmitters 210 into a single output to optical communication path 235.

Optical communication path 235 may include an optical transmission fiber or group of fibers. The optical transmission fiber or group of fibers may include silica fibers or any other type of optic fiber. Optical communication path 235 may include an optical signal transmission line that transmits one or more optical signals from multiplexer 230 to demultiplexer 240.

Optical communication path 235 may traverse a long distance, such as hundreds or thousands of kilometers, over which optical signals may degrade in the transmission line, as discussed above. Optical communication path 235 may use one or more amplifiers, such as Erbium Doped Fiber Amplifiers (EDFAs), Raman amplifiers, etc., along with other components to provide the optical signals along the transmission line.

Demultiplexer 240 may include a demultiplexer, an optical decombiner, an optical splitter, an AWG, and/or one or more filters. Demultiplexer 240 may decombine or demultiplex one or more optical signals from optical communication path 235 into multiple optical signals for detector circuits 250 and receivers 260.

Detector circuits 250 may include circuits that are part of receivers 260 or separate from receivers 260, such as separate modules, cards, or boards. Detector circuits 250 may include an amplifier to convert photocurrent to a proportional voltage. In one implementation, the amplifier may include a transimpedence amplifier (TIA). Detector circuits 250 may also include an Analog-to-Digital Converter (ADC) to digitize one or more analog signals provided from demultiplexer 240. Detector circuits 250 may also include a DSP to process digital signals from demultiplexer 240 (via ADC).

If detector circuits 250 are implemented external to receivers 260, detector circuits 250 may be provided between decombiner 240 and receivers 260. Detector circuit 250 may include a receiver-side element that may communicate with receivers 260 to provide a number of channels or other information to receivers 260, either directly to receivers 260 or through network control plane 270. A receiver-side element may be provided on a per-receiver 260 basis or may be provided to be shared among multiple receivers 260. For example, an optical switch connected to optical taps on each receiver's input fiber may be used to share a receiver-side element with multiple receivers 260. Detector circuits 250 will be discussed further below with respect to FIGS. 4 and 5.

Receivers 260 may include optical receivers, such as photodiodes. Receivers 260 may receive one or more optical signals or channels from demultiplexer 240 and/or detector circuits 250.

Network control plane 270 may include computing hardware or a combination of hardware and software configured to control system 200. Network control plane 270 may be configured to control transmitters 210, identification generators 220, multiplexer 230, demultiplexer 240, detector circuits 250, and/or receivers 260. Network control plane 270 may also be configured to control one or more control modules in system components as a different level of control. For example, network control module 270 may control the entirety of system 200 (e.g., across the country). Network control plane 270 will be discussed further with respect to FIG. 6.

Figure 3:
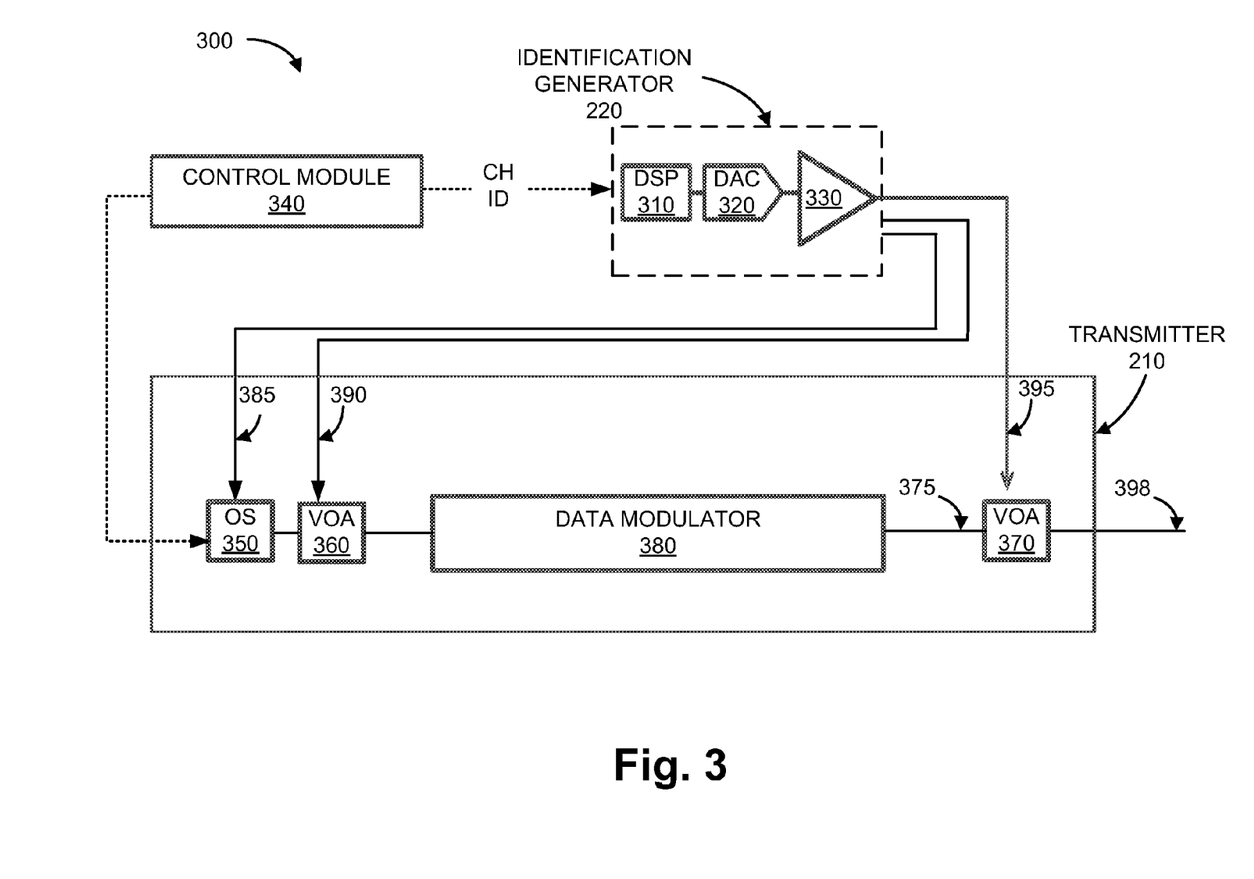
FIG. 3 is an illustration of an example implementation of a transmission module, as described herein.

FIG. 3 is an illustration of an example implementation of a transmission module 300. Transmission module 300 may include a transmitter 210, an identification generator 220, and a control module 340.

In one implementation, transmitter 210 may include an optical source 350, Variable Optical Attenuators (VOAs) 360, 370, and a data modulator 380. Transmitter 210 may, in some implementations, include fewer or more components.

Optical source 350 may include a laser. Optical source 350 may provide an optical signal to VOA 360.

VOAs 360, 370 may include Mach-Zehnder interferometers or other devices that may adjust an optical power level, such as diffraction or aperture based devices. VOAs 360, 370 may adjust an optical power level of optical signals from optical source 350 and may be controlled and adjusted by control module 340 and/or a network control plane, such as network control plane 270.

Data modulator 380 may include a polarization splitter, multiple photodiodes, a modulation circuit, a polarization rotator, and/or a polarization beam combiner. Data modulator 380 may provide data modulated signal 375, to VOA 370, by modulating an optical signal from optical source 350. Data can be encoded on the optical source in optical amplitude, phase, frequency, polarization, or any combination thereof.

Identification generator 220 may include a DSP 310, a DAC 320, and an amplifier 330. Identification generator 220 may include other components in other implementations. In one implementation, identification generator 220 may be in communication with optical source 350 and VOAs 360, 370 in transmitter 210. Identification generator 220 may provide channel identification to one or more VOAs, such as VOAs 360, 370, in transmitter 210.

Control module 340 may include circuitry that may control optical source 350 in transmitter 210. In one implementation, control module 340 may directly control optical source 350 to adjust an optical signal from optical source 350. Additionally, or alternatively, control module 340 may control identification generator 220 to communicate channel identification information to transmitter 210. Additionally, or alternatively, control module 340 may control identification generator 220 such that identification generator 220 produces a trace tone.

Identification generator 220 may provide a trace tone to portions of transmitter 210 for superimposing on a data signal. In one implementation, optical source 350 may be driven directly (arrow 385), for example, by identification generator 220, which may provide amplitude modulation of the optical source to superimpose the trace tone from identification generator 220 on the optical signal 398 prior to encoding data via data modulator 380. Additionally, or alternatively, identification generator 220 may send a signal (arrow 390) to VOA 360 to amplitude modulate an output of optical source 350 with the trace tone from identification generator 220 to form trace tone superimposed on optical signal 398 prior to encoding data via data modulator 380. Additionally, or alternatively, identification generator 220 may send a signal (arrow 395) to VOA 370 to amplitude modulate data modulated signal 375 from data modulator 380 to form trace tone superimposed optical signal 398.

FIG. 3 shows example components of transmission module 300 for explanatory purposes only. In other implementations, transmission module 300 may include fewer components, different components, differently arranged components, or additional components than depicted in FIG. 3. Alternatively, or additionally, one or more components of transmission module 300 may perform one or more tasks described as being performed by one or more other components of transmission module 300.

Figure 4:
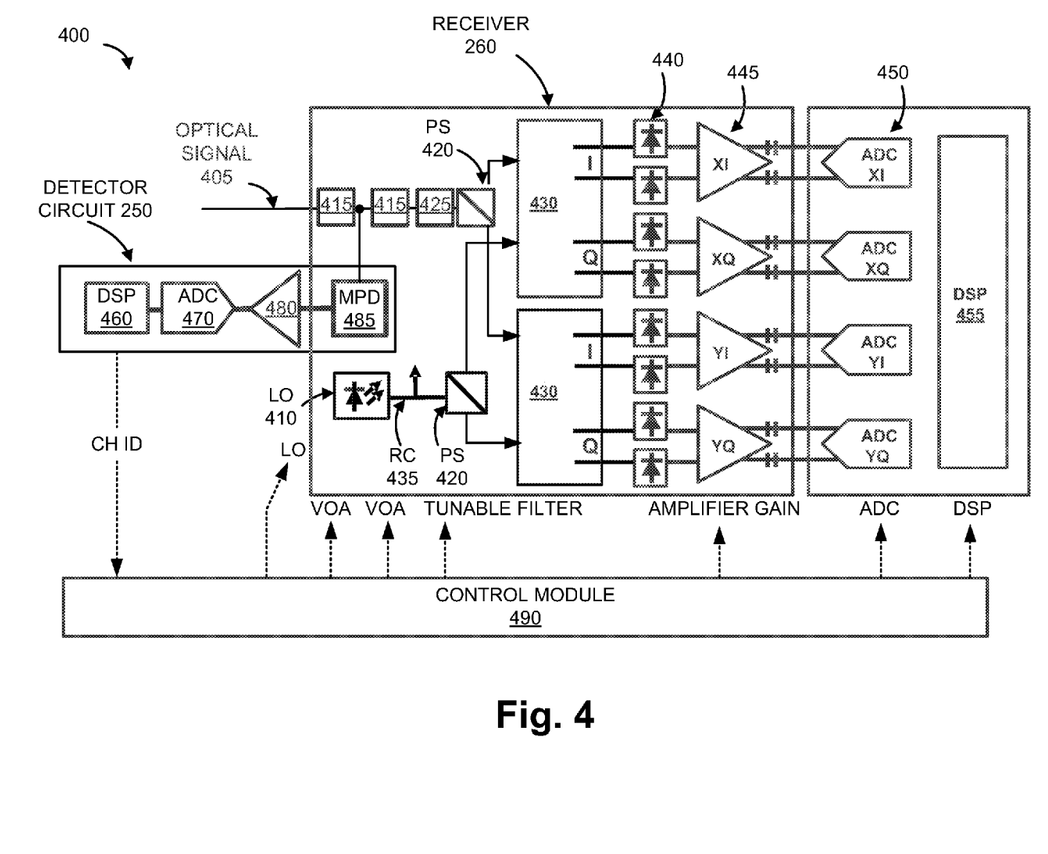
FIG. 4 is an illustration of an example implementation of a receiver module, as described herein.

FIG. 4 is an illustration of an example implementation of a receiver module 400, as described herein. Receiver module 400 may include receiver 260 with a LO 410, multiple VOAs 415, multiple polarization splitting elements 420, a tunable filter 425, multiple hybrid mixers 430, multiple photodetectors 440, multiple amplifiers/filters 445, multiple ADCs 450, a DSP 455, and a monitor photodetector (MPD) 485. Receiver module 400 may also include detector circuit 250 with a DSP 460, an ADC 470, and an amplifier 480. Receiver module 400 may also include a control module 490.

LO 410 may be a device that may be used to discriminate channel(s) of interest from multiple channels that may be incident on receiver 260, such as a laser. In one implementation, LO 410 in conjunction photodetectors 440 may perform a filtering function. LO 410 may be controlled by control module 490 to set the frequency of LO 410 to a particular frequency (e.g., receiver channel 435). Optical signal 405 may be mixed with receiver channel 435 from LO 410, and depending on the frequency or frequencies in optical signal 405, the combination of receiver channel 435 and optical signal 405 may or may not be received by DSP 455.

For example, an electrical representation of optical signal 405 may be received by DSP 455 of receiver 260 when the frequency of optical signal 405 is sufficiently close to the frequency of receiver channel 435 of LO 410. If the frequencies are close, but not close enough, the electrical representation of optical signal 405 may be transmitted to DSP 455 in a degraded state. If the frequencies are too far apart, then DSP 455 may receive no electrical representation of optical signal 405 (e.g., due to the filtering provided by the combination of tunable filter 425, receiver channel 435, photodetector 440, and amplifier/filter 445), resulting in the information in optical signal 405 being lost.

Additionally, or alternatively, LO 410 may sweep and pick out a channel based on multiple channels becoming incident on receiver 260. For example, if a trace tone frequency is not provided, but one or more channels are incident on receiver 260, then LO 410 may step through a range of potential channels, and may detect one or more channels in optical signal 405.

VOAs 415 may include Mach-Zehnder interferometers or other devices that may adjust an optical power level, such as diffraction or aperture based devices. VOAs 415 attenuation may be controlled and adjusted by control module 490 and/or a network control plane, such as network control plane 270. VOA 415 may be located in the optical signal path before or after the tap of monitor photodetector 485, or VOA 415 may be located in the optical signal path before or after polarization splitting element 420 (not shown).

Polarization splitting element 420 may include a prism, such as a Wollaston prism, or polarization splitting element 420 may include any optical device that may split an incident beam into differing polarizations, such as a linear polarizer, using polarization by reflection, birefringence, thin film interference, or any combination thereof. Polarization splitting element 420 may be provided to separate an input signal into two orthogonal polarizations, with each polarization delivered to the two hybrid mixers 430.

Polarization splitting element 420 may also include a polarization maintaining power splitter. Polarization splitting element 420 may include a partially reflecting mirror to transmit a portion of light from LO 410 to a first of the hybrid mixers 430. Polarization splitting element 440 may reflect the remainder of the light to a second of the hybrid mixers 430. In one implementation, polarization splitting element 420 may split power from LO 410 to two hybrid mixers 430.

Tunable filter 425 may include a filter, such as an optical filter, that may be adjusted to set the optical frequency of the filter. Tunable filter 425 may be controlled by control module 490 and/or a network control plane, such as network control plane 270, to adjust the optical frequency, bandwidth, or both (as part of the receiver settings). Tunable filter 425 may be located in the signal path after the tap of MPD 485 and may be before or after polarization splitting element 420. Tunable filter 425 can be a fixed bandwidth and filter shape, or adjustable bandwidth and/or shape. Tunable filter 425 may also include a ring resonator, or the tunable optical filter based on a Bragg grating, an AWG, a Mach-Zehnder interferometer, a Fabry-Perot interferometer, or other structures using diffraction, reflection, polarization, and/or interference to obtain the desired optical filtering. For example, tunable filter 425 may include a filter with a second order super-Gaussian profile and 400 GHz optical bandwidth, or other filter shapes and optical bandwidths may also be used.

Hybrid mixers 430 may include coherent mixers that may be polarization sensitive, polarization-insensitive, or polarization diverse. Hybrid mixers 430 may be provided with differential outputs. Hybrid mixers 430 may mix signals from optical signal 405 and LO 410 to output signals to multiple photodetectors 440.

Hybrid mixers 430 may be provided, along with polarization splitting elements 420, to provide receiver module 400 with polarization and phase diversity. For example, two hybrid mixers 430 may be provided to mix inputs from polarization splitting elements 420. Hybrid mixers 430 may output signals in-phase (I) or in quadrature phase (Q) (e.g., 90 degrees out of phase from in-phase (I)) to photodetectors 440.

Photodetectors 440 may include photodiodes. In one implementation, photodetectors 440 may be provided as sets of balanced photodetectors. For example, as illustrated in FIG. 4, eight photodetectors 440 may be provided as four sets of balanced photodetectors 440. Photodetectors 440 may receive mixed LO and signals from hybrid mixers 430 and provide electrical representations of the optical signals to electrical amplifiers/filters 445.

Amplifiers/filters 445 may include linear amplifiers, nominally linear amplifiers, filters, or combinations thereof. In one implementation, amplifier/filter 445 may be provided with differential outputs and may be controlled by control module 490 to provide gain adjustment for amplifier 480 in detector circuit 250. In another implementation, amplifier/filter 445 may be provided to filter in addition to amplify. For example, amplifier/filter 445 may include a separate element filter that may be combined with an amplifier, ADC, DSP, or distributed in any combination thereof.

ADCs 450 may include a device, such as an integrated circuit, that may convert analog electrical signals to digital electrical signals. ADC 470 may be similar to ADC 450, but operating at a lower sampling rate. ADCs 450 may digitize analog electrical signals from amplifiers 445 to provide to DSP 455. Similarly, ADC 470 may digitize an analog electrical signal from amplifier 480 to provide to DSP 460.

DSPs 455, 460 may include processors, such as integrated circuits or the like. DSPs 455, 460 may provide digital signal processing. DSP 455 may be used in receiver 260 to process digitized signals from ADCs 450. Similarly, DSP 460 may be used in detector circuit 250 to process a digitized signal from ADC 470.

Amplifier 480 may include a TIA, a linear amplifier, or a nominally linear amplifier. Amplifier 480 may be used to convert a photocurrent to a proportional voltage.

Monitor photodetector 485 may include a diode, such as a photodiode, that detects a trace tone, such as an amplitude modulated trace tone. In one implementation, high speed data detection diodes, such as photodetectors 440, may be used instead of monitor photodetector 485 to convert the amplitude modulation of a trace tone to an electrical baseband representation.

Control module 490 may include circuitry that may control portions of receiver module 400 or a digital signal processor or a computer with a microprocessor. In one implementation, control module 490 may control LO 410 to set the frequency of LO 410 to a particular optical frequency, optical power, or combination thereof. Control module 490 is further discussed with respect to FIG. 6.

LO 410 may be directed by the management system (e.g., control module 490 or network control plane 270) to be set to a predetermined frequency (e.g. corresponding to the predetermined trace tone or channel frequency).

Additionally, or alternatively, a digital filter in DSP 460, if network control plane 270 cannot or will not provide a predetermined trace tone frequency, may be set discover a frequency for an optical signal based on the trace tone frequency. For example, the frequency of a digital filter may be set by auto-discovering what channels are present at receiver 260, and setting the frequency of LO 410 based upon one or more of the channels that can be auto-discovered.

Auto-discovering channels may occur in parallel to a data path, so as to be non-service affecting by design, but also by monitoring a photocurrent from one or more of data photodetectors to accomplish the auto-discovery frequency (e.g., trace tone frequency) detection.

With the number of channels at the receivers 260 known, the optical power per channel may be determined and reported along with the total optical receiver power. This information may then be used to adjust receiver settings for optimal performance (e.g. adjusting the LO power, TIA gain setting, or DSP properties such as anti-aliasing filters).

In addition, the depth of the trace tone modulation may used to measure additional properties of optical signal 405. This includes estimating the optical noise on optical signal 405 by comparing power in the trace tone to that of the total power in optical signal 405, and/or estimating the relative power of other optical signals in system 200 by comparing the power in their respective trace tones.

By providing optical systems 200 that include detector circuit 250, receiver 260 can identify (while in service) the number of channels incident on receiver 260, respective channel (channel) frequencies incident on receiver 260, relative powers of the optical channels, and optical SNRs for the channels without requiring information from a network control plane.

Figure 5:
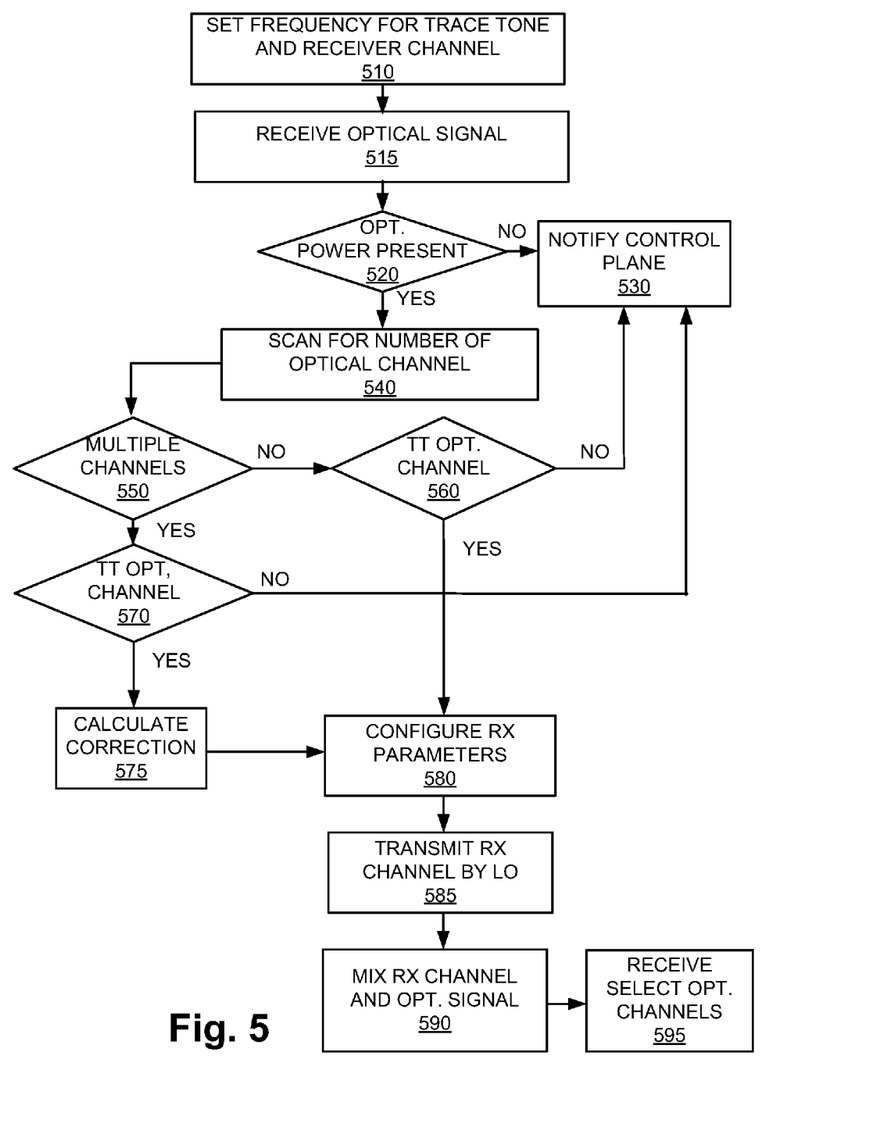
FIG. 5 is an example flow diagram of an example process for identifying and receiving optical channels, as described herein.

FIG. 5 is an example flow diagram of an example process 500 for identifying and receiving optical channels. Process 500 may be performed by components of receiver module 400 and/or network control plane 270.

Process 500 may include setting a frequency for a trace tone and a receiver channel for a local oscillator (block 510). In one implementation, the frequency for the trace tone and/or the receiver channel can be set by control module 490 and/or a control plane. For example, the frequency for a trace tone (e.g., the frequency that DSP 460 is set to find in optical signal 405) and/or receiver channel 435 (e.g., the optical frequency that LO 410 is set to filter) can be set by a control plane directly, such as network control plane 270, by the control plane via control module 490, or by control module 490. For example, the frequency for the trace tone may be between 1 Hz and 1 GHz, and the frequency for receiver channel 435 may be between 190 THz and 200 THz.

Process 500 may include receiving an optical signal (block 515). In one implementation, monitor photodetector 485 can receive optical signal 405. For example, optical signal 405 can be received by receiver 260, and optical signal 405 can be tapped off with an optical power tap (e.g., an optical power splitter) and provided to monitor photodetector 485. By tapping optical signal 405, monitor photodetector 485 can provide a measure of the total optical receiving power along with a measure of the frequency of the trace tone superimposed on optical signal 405. The measure of the total optical receiving power along with the measure of the frequency of the trace tone superimposed on optical signal 405 may be converted to a digital representation by ADC 470 and digital signal processing performed by DSP 460 to determine the trace tones present. An additional analog filter may also be included between monitor photodetector 485 and ADC 470, if there is excessive bandwidth. Note that analog implementations may also be possible.

Process 500 may include determining if receiver optical power is present (block 520). In one implementation, the digital representation from ADC 470 of the measure of the total optical receiving power along with the measure of the frequency of the trace tone or tones superimposed on optical signal 405 may be provided to DSP 460, control module 490, and/or network control plane 270. DSP 460, control module 490, and/or network control plane 270 may determine, based on the monitoring from monitor photodetector 485, if receiver optical power is present. For example, DSP 460 may determine whether the digital representation from ADC 470 of the measurement by monitor photodetector 485 has receiver optical power present. Additionally, or alternatively, DSP 460 may provide the digital representation from ADC 470 to control module 490 and control module 490 may determine if receiver optical power is present. Additionally, or alternatively, DSP 460 may provide the digital representation from ADC 470 to network control plane 270 via control module 490, and network control plane 270 may determine if receiver optical power is present.

Process 500 may include notifying a control plane (block 530) if optical power is not present (block 520—NO). In one implementation, DSP 460 and/or control module 490 may notify a control plane, such as network control plane 270, that optical power is not present. For example, network control plane 270 may provide control over a system, such as system 200, and may control transmitter module 300 and receiver module 400, as well as any or all components associated with the modules or the system. Network control plane 270 may include a server or computing device. An example network control plane 270 will be further discussed with respect to FIG. 6. By notifying network control plane 270, network control plane 270 can control receiver module 400 to continue to monitor for optical power being present (block 520) until optical power is present (block 520—YES).

Process 500 may include scanning for one or more optical channels in an optical signal (block 540), if optical power is present (block 520—YES). In one implementation, DSP 460 may scan for one or more trace tone frequencies (e.g., channel identifications) in optical signal 405, which may correspond to one or more optical channels of optical signal 405. For example, DSP 460 may process digital representations from ADC 470 of monitored information from monitor photodetector 485 to scan for a trace tone frequency in optical signal 405.

In one implementation, one or more trace tone frequencies corresponding to one or more optical channels of optical signal 405 may be provided by network control plane 270. For example, network control plane 270 may set the trace tone frequency and receiver channel 435 frequency such that when the trace tone frequency is used to identify a particular optical channel, the receiver channel 435 frequency is set to the frequency of the particular optical channel.

Additionally, or alternatively, one or more trace tone frequencies corresponding to one or more optical channels of optical signal 405 may be set by a third party or unknown network (e.g., a network unrelated to receiver module 400 or network control plane 270) such that network control plane 270 does not control or have information about a particular optical signal incoming to receiver 260. In one implementation, detector circuit 250 may scan multiple optical channel frequencies to find one or more particular optical channels that receiver 260 may receive and process. For example, a third party may provide optical signal 405 to receiver 260, and detector circuit 250 may scan to determine the number of optical channels in optical signal 405 incident on receiver 260.

Process 500 may include determining whether multiple channels are present (block 550). In one implementation, DSP 460 or control module 490 may include logic for detecting multiple channels from the scan results of DSP 460 in block 540. For example, DSP 460 may process digital representations from ADC 470 of monitored information from monitor photodetector 485 to determine whether multiple channels are present in optical signal 405.

Process 500 may include determining whether a trace tone frequency optical channel (e.g., a channel with the trace tone frequency set in block 510) is present (blocks 560, 570) if there are multiple channels present (block 550—YES) or if there not multiple channels present (block 550—NO). In one implementation, DSP 460 or control module 490 may include logic for detecting the trace tone frequency in an optical channel of optical signal 405. For example, DSP 460 may process the digital representation from ADC 470 of monitored information from monitor photodetector 485 to determine whether a trace tone frequency optical channel is present in optical signal 405. As another example, DSP 460 may provide the digital representation from ADC 470 to control module 490 to determine whether a trace tone frequency optical channel is present in optical signal 405. Additionally, or alternatively, DSP 460 may provide may provide the digital representation from ADC 470 to control module 490, which may provide information to network control plane 270, and network control plane 270 may determine whether a trace tone frequency optical channel is present in optical signal 405.

Process 500 may include notifying the control plane (block 530), if no trace tone frequency optical channel is present (block 560 or 570=NO). In one implementation, the control plane, such as network control plane 270, may be notified that no trace tone frequency optical channel is present by DSP 460 and/or control module 490. Network control plane 270 may, if no trace tone frequency optical channel is present, determine if there was no trace tone frequency optical channel initially transmitted. Alternatively, network control plane 270 may, if no trace tone frequency optical channel is present, determine that there may be a discontinuity in optical system 200 preventing the trace tone frequency from being present.

Process 500 may include calculating and applying a correction (block 575), if the trace tone frequency optical channel is present (block 570—YES) and multiple channels are present (block 550—YES). In one implementation, detector circuit 250 may pass information, such as the number of channels incident on receiver 260, frequencies of these channels, power (relative or absolute) in these channels, and/or SNR to DSP 460, control module 490, and/or network control plane 270, and DSP 460, control module 490, and/or network control plane 270 may calculate correction factors that may be applied. For example, network control plane 270 may calculate correction factors that may be applied to a preset default operating condition, such as increasing altering the frequency for a trace tone superimposed on an optical channel of optical signal 405, to provide corrections for a system, such as system 200.

Process 500 may include configuring receiver parameters (block 580). In one implementation, control module 490 and/or network control plane 270 may configure receiver 260 to a particular set of receiver parameters. For example, control module 490 and/or network control plane 270 may configure receiver parameters, such as LO 410 frequency, LO 410 optical power, amplifier 445 gain, amplifier 445 output power, amplifier 445 voltage swing, VOA 415 attenuation, tunable optical filter 425 frequency, tunable optical filter 425 bandwidth, ADC 450 input buffer gain (or loss), or DSP 455 settings. Control module 490 and/or network control plane 270 may configure receiver 260 to adjust receiver attributes to provide higher SNR, signal filtering, etc.

Process 500 may include transmitting receiver channel 435 by LO 410 (block 585). In one implementation, LO 410 can be set to a predetermined frequency by control module 490 or network control plane 270. For example, control module 490 or network control plane 270 may control LO 410 to transmit receiver channel 435 at the predetermined frequency. Network control plane 270 may set a transmitter, such as transmitter 210, to the predetermined frequency, may set a receiver, such as receiver 260, to the same predetermined frequency, and may also set LO 410 to the predetermined frequency such that LO 410 transmits receiver channel 435 at the same predetermined frequency.

Process 500 may include mixing receiver channel 435 and optical signal 405 (block 590). In one implementation, hybrid mixer 430 may mix receiver channel 435 and optical signal 405. For example, receiver channel 435 can be split by polarization splitter 420 into two secondary receiver channels and optical signal 405 can be split by another polarization splitter 420 into two secondary optical signals. A first of the two secondary receiver channels 415 and a first of the two secondary optical signals may be mixed in a first of two hybrid mixers 430 and output as four optical channels (e.g., two in-plane (I) and two quadrature (Q) optical signals as illustrated in FIG. 4) with the frequency of receiver channel 435 and the optical power and optical data of optical signal 405. Similarly, the second of the two secondary receiver channels 415 and the second of the two secondary optical signals may be mixed in a second of two hybrid mixers 430 and output as four optical channels (e.g., two in-plane (I) and two quadrature (Q) optical signals as illustrated in FIG. 4) with the frequency of receiver channel 435 and the optical power and optical data of optical signal 405.

Process 500 may include receiving select optical channels from the mixed optical signal 405 and receiver channel 435 (block 595). In one implementation, receiver 260, including photodetectors 440, amplifiers 445, ADCs 450, and/or DSP 455, may receive select optical channels from the mixed optical signal 405 and receiver channel 435 and process data in the select optical channel. For example, the select optical channels may include data from optical signal 405 that are filtered by LO 410 using the frequency of receiver channel 435, which may allow the select optical channels that have a close frequency to receiver channel 435 from optical signal 405 to be received by receiver 260 for processing to output a data stream.

Figure 6:
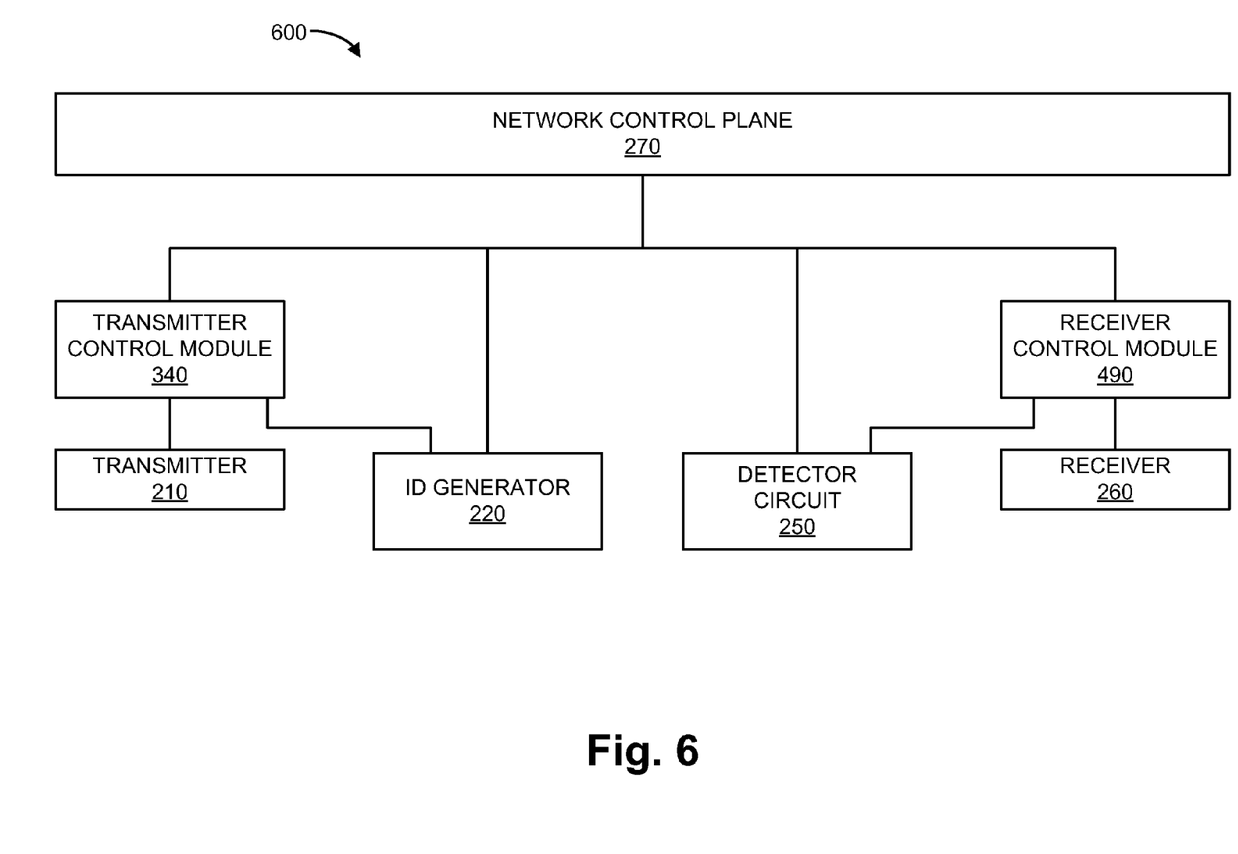
FIG. 6 is an illustration of a network control plane in an optical system, as described herein.

FIG. 6 illustrates an example control system 600. As illustrated in FIG. 6, control system 600 may include network control plane 270, transmitter control module 340, transmitter 210, identification generator 220, detector circuit 250, receiver control module 490, and receiver 260.

Network control plane 270 may include hardware and software to provide control over optical channels in example system 200. Network control plane 270 may provide control over the optical channels from transmitters 210 to receivers 260. Network control plane 270 may also include a management system or the like that can provide a higher layer of control. For example, network control plane may provide a higher layer of control over lower layers of control modules, such as transmitter control module 340, transmitter 210, identification generator 220, detector circuit 250, receiver control module 490, and receiver 260, as illustrated in FIG. 6. Network control plane 270 may control an optical system, such as system 200, which may include control module 340 of transmitter module 300 (e.g., transmitter control module 340) and/or control module 490 of receiver module 400 (e.g., receiver control module 490).

Transmitter control module 340 may include hardware and software to provide control over optical channels in transmitter 210. In one implementation, transmitter control module 340 may receive instructions from network control plane 270. For example, network control plane 270 may provide transmitter control module 340 with information identifying a predetermined frequency for an optical channel in an optical signal, and a trace tone frequency for superimposing a channel identifying trace tone on an optical signal.

Identification generator 220 may be controlled by network control plane 270 and/or transmitter control module 340 depending on the system. In one implementation, network control plane 270 may directly control identification generator 220, and transmitter control module 340 may control transmitter 210. In another implementation, network control plane 270 may indirectly control identification generator 220. For example, network control plane 270 may control transmitter control module 340, and transmitter control module 340 may control identification generator 220 to generate a trace tone at a particular frequency as set by network control plane 270.

Detector circuit 250 may be controlled by network control plane 270 and/or receiver control module 490. In one implementation, network control plane 270 may directly control detector circuit 250, and receiver control module 490 may directly control receiver 260. In another implementation, network control plane 270 may indirectly control detector circuit 250. For example, network control plane 270 may control receiver control module 490, and receiver control module 490 may control detector circuit 250 to identify a trace tone of a particular frequency as set by network control plane 270.

Receiver control module 490 may be controlled by network control plane 270 and may provide control signals to receiver 260 and/or detector circuit 250. In one implementation, receiver control module 490 may receive instructions from network control plane 270. For example, network control plane 270 may provide receiver control module 490 with information identifying a predetermined frequency for detecting an optical channel in an optical signal, and a trace tone frequency for detecting a channel identifying trace tone in an optical signal.

Systems and/or methods, described herein, may provide superimposed channel identification trace tones on optical transmission channels to provide channel identifications for optical systems and/or methods. The superimposed channel identification trace tones may include amplitude modulations of optical signals in optical transmission channels. The superimposed channel identification trace tones may be uniquely chosen such that a particular optical channel trace tone frequency may be distinguished from other optical channel trace tone frequencies to identify one or more optical channels from other optical channels that may also be incident upon a single receiver.

The foregoing description of implementations provides illustration and description, but is not intended to be exhaustive or to limit the implementations to the precise form disclosed. Modifications and variations are possible in light of the above teachings or may be acquired from practice of the invention.

For example, while a series of blocks has been described with regard to FIG. 5, the order of the blocks may be modified in other implementations. Further, non-dependent blocks may be performed in parallel.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Further, the term "approximately" has been used throughout the description and is intended to mean the exact number or range that follows the term or a number within a particular threshold of the number or range that follows the term.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. An optical system comprising:
   a demultiplexer to:
      receive an optical signal,
         the optical signal being associated with a frequency that is based on superimposing a predetermined channel identification trace tone frequency with an optical channel frequency; and
      demultiplex the optical signal into a plurality of optical channels;
   a detector circuit to:
      receive the plurality of optical channels;
      identify the predetermined channel identification trace tone frequency for an optical channel of the plurality of optical channels;
      convert the identified predetermined channel identification trace tone frequency to a digital representation; and
      transmit, based on converting the identified predetermined channel identification trace tone frequency to the digital representation, information associated with the digital representation to a control device; and
   a receiver to:
      receive the optical channel with the identified predetermined channel identification trace tone frequency from the detector circuit;
      receive, by a local oscillator, information from the control device; and
      process, using the received information, the optical channel to output a data stream,
         the optical channel being processed using a first polarization split signal and a second polarization split signal, and
         the local oscillator being set to the optical channel frequency based on the predetermined channel identification trace tone frequency.

2. The optical system of claim 1, where the receiver comprises:
   a receiver control module to control the detector circuit and the receiver,
      the receiver control module being to:
         set, using the received information, the receiver to filter the optical signal based on the predetermined channel identification trace tone frequency.

3. The optical system of claim 1, where the detector circuit is provided on one or more modules separate from the receiver.

4. The optical system of claim 1, where the local oscillator provides a receiver channel with a predetermined frequency to the receiver.

5. The optical system of claim 1, further comprising:
   a plurality of transmitters to transmit the plurality of optical channels;
   an identification generator to superimpose the predetermined channel identification trace tone frequency on the optical channel; and
   a multiplexer to combine the plurality of optical channels into the optical signal and send the optical signal to the receiver.

6. The optical system of claim 5, further comprising:
   a network control plane to control the plurality of transmitters, the identification generator, the multiplexer, the demultiplexer, the detector circuit, and the receiver.

7. The optical system of claim 5, where the identification generator superimposes the predetermined channel identification trace tone frequency at a frequency that does not interfere with a transmission frequency of the plurality of optical channels.

8. The optical system of claim 7, where the predetermined channel identification trace tone frequency comprises a frequency between 1 hertz (Hz) and 1 gigahertz (GHz).

9. A method comprising:
   setting, by one or more devices, a predetermined channel identification trace tone frequency;
   superimposing, by the one or more devices, the predetermined channel identification trace tone frequency on an optical signal, the optical signal being associated with a frequency that is based on superimposing the predetermined channel identification trace tone frequency with an optical channel frequency;

receiving, by the one or more devices, the optical signal with the superimposed predetermined channel identification trace tone frequency;

scanning, by the one or more devices, for channel identification trace tone frequencies in the optical signal;

identifying, by the one or more devices, the predetermined channel identification trace tone frequency in the optical signal based on scanning for the channel identification trace tone frequencies in the optical signal;

converting, by the one or more devices, the identified predetermined channel identification trace tone frequency to a digital representation;

providing, by the one or more devices and based on converting the identified predetermined channel identification trace tone frequency to the digital representation, information associated with the digital representation to a control module of the one or more devices;

setting a local oscillator, by the control module and using the information associated with the digital representation, to a predetermined filter frequency for a receiver channel;

filtering the optical signal, by the local oscillator, to output a select channel based on the predetermined channel identification trace tone frequency; and processing the select channel, by the one or more devices, to output a data stream,
  the select channel being processed using a first polarization split signal and a second polarization split signal, and
  the local oscillator being set to the predetermined filter frequency based on the predetermined channel identification trace tone frequency.

10. The method of claim 9, where
setting the predetermined channel identification trace tone frequency comprises:
  receiving, from a network control plane, information identifying the predetermined channel identification trace tone frequency,
  setting the predetermined channel identification trace tone frequency for superimposing on the optical signal, and
  setting the predetermined filter frequency for the receiver channel to correspond to the predetermined channel identification trace tone frequency based on the received information identifying the predetermined channel identification trace tone frequency, and
setting the local oscillator to the predetermined filter frequency for the receiver channel comprises:
  receiving, from the network control plane, information identifying the predetermined filter frequency for the receiver channel, and
  setting the local oscillator to the predetermined filter frequency for the receiver channel based on the received information identifying the predetermined filter frequency.

11. The method of claim 9, further comprising:
scanning for channel identification trace tone frequencies in the optical signal when the optical signal is provided by a third party source; and
setting the predetermined channel identification trace tone to one or more of the channel identification trace tone frequencies found during the scanning for the channel identification trace tone frequencies in the optical signal when the optical signal is provided by the third party source.

12. The method of claim 11, where identifying the predetermined filter frequency for the receiver channel in the optical signal comprises:
  setting an optical frequency for the local oscillator to correspond within approximately 10 gigahertz (GHz) to an optical frequency of the predetermined filter for the receiver channel;
  converting the optical frequency into a baseband electrical signal via mixing with the optical signal in a photodetector; and
  isolating the predetermined filter frequency for the receiver channel.

13. The method of claim 9, further comprising:
adjusting receiver settings by the control module,
  where the receiver settings include one or more of:
    local oscillator optical power,
    amplification gain,
    amplifier output power,
    amplifier voltage swing,
    variable optical attenuator attenuation,
    tunable optical filter frequency,
    tunable optical filter bandwidth,
    input buffer gain or loss, or
    digital signal processor settings.

14. The method of claim 9, further comprising:
selecting the predetermined filter frequency for the predetermined channel identification trace tone frequency such that the predetermined filter frequency is distinguishable from a predetermined filter frequency for other predetermined channel identification trace tones.

15. The method of claim 9, where setting the predetermined channel identification trace tone frequency comprises selecting a frequency between 10 kilohertz (kHz) and 1 megahertz (MHz) for setting the predetermined channel identification trace tone frequency.

16. A receiver device comprising:
a detector circuit to:
  receive an optical signal with a plurality of different optical channels of different frequencies including an optical channel with a particular frequency,
    the particular frequency being based on superimposing an amplitude modulated trace tone frequency with an optical channel frequency;
  scan the optical signal for the optical channel with the particular frequency;
  identify the optical channel with the particular frequency;
  convert the particular frequency to a digital representation; and
  transmit, based on converting the particular frequency to the digital representation, information associated with the digital representation to a control device; and
a receiver to:
  receive the optical signal with the plurality of different optical channels including the optical channel with the particular frequency;
  receive, by a local oscillator, information from the control device;
  filter, using the received information, the optical signal to receive the optical channel with the particular frequency; and
  process the optical channel with the particular frequency to output a data stream, the optical channel being processed using a first polarization split signal and a second polarization split signal, and the local oscillator being set to the optical channel frequency based on the particular frequency.

17. The receiver device of claim 16, further comprising:
a receiver control module to control the detector circuit and the receiver,
where the receiver control module is further to:
set, using the received information, the receiver to filter the optical signal to receive the optical channel with the particular frequency.

18. The receiver device of claim 16, where the local oscillator forms a receiver channel with a predetermined filter frequency, and
the receiver further comprises:
a mixer to:
receive the optical signal and to receive the receiver channel from the local oscillator;
mix the optical signal and the receiver channel to form coherent signals; and
output the coherent signals as in-phase (I) portions or in quadrature phase (Q) portions; and
a photodetector to:
mix the I portions of the coherent signals to generate electrical representations of the optical channel;
mix the Q portions of the coherent signals to generate electrical representations of the optical channel; and
electrically filter the electrical representations to remove at least a portion of the received optical signal.

19. A transmitter device comprising:
at least one optical source to generate an optical channel, the optical channel being associated with an optical channel frequency;

at least one identification generator to provide a trace tone frequency,
the at least one identification generator being to superimpose the trace tone frequency with the optical channel frequency to create a particular frequency, or
the at least one optical source being to superimpose the optical channel frequency with the trace tone frequency to create the particular frequency; and
a multiplexer to transmit an optical signal associated with the optical channel,
the trace tone frequency being converted to a digital representation,
information, associated with the digital representation, being transmitted to a control device based on the trace tone frequency being converted to the digital representation, and
the optical signal being processed based on information being received by a local oscillator and from the control device,
the optical channel being processed using a first polarization split signal and a second polarization split signal, and
the local oscillator being set to the optical channel frequency based on the trace tone frequency.

20. The transmitter device of claim 19, where the multiplexer is further to:
combine the optical channel with another optical channel to generate the optical signal.

21. The transmitter device of claim 19, where the at least one optical source is further to:
transmit at least one optical channel with the optical channel frequency set to approximately 180-210 terahertz (THz); and
transmit at least one optical channel with at least one trace tone with the trace tone frequency set to approximately 1 hertz (Hz) to 1 gigahertz (GHz).

* * * * *